United States Patent [19]

Wakayama et al.

[11] 3,764,567
[45] Oct. 9, 1973

[54] PERFUME COMPOSITION
[75] Inventors: Seiji Wakayama, Sapporo; Akira Komatsu, Tokyo, both of Japan
[73] Assignee: Takasago Perfumery Co., Ltd., Tokyo, Japan
[22] Filed: Aug. 24, 1971
[21] Appl. No.: 174,493

[30] Foreign Application Priority Data
Aug. 29, 1970 Japan.............................. 45/75838

[52] U.S. Cl. .............................. 252/522, 260/347.8
[51] Int. Cl. ............................................. C11b 9/00
[58] Field of Search .................. 252/522; 260/347.8

[56] References Cited
UNITED STATES PATENTS
3,227,731  1/1966  Kulka................................ 252/522 X
3,668,134  6/1972  Lamberti et al. ............... 252/522 X Primary Examiner—Albert T. Meyers
Assistant Examiner—Frederick E. Waddell
Attorney—Lane, Aitken, Dunner & Ziems

[57] ABSTRACT

A new compound, 2-(1'-hydroxymethyl-ethyl)-5-methyl-5-vinyl-tetrahydrofuran has been discovered in an essential oil of a lilac flower. This compound consists of four steroisomers and is useful as an ingredient to be incorporated in floral perfumes. This compound is obtained by selectively reducing the formyl radical of 2-(1' formylethyl)-5-methyl-5-vinyl-tetrahydrofuran.

3 Claims, No Drawings

PERFUME COMPOSITION

This invention relates to a new compound, 2-(1'-hydroxymethyl)-5-methyl-5-vinyl-tetrahydrofuran.

A new compound which is useful as a perfume ingredient has been discovered in a alcoholic section of an essential oil of a lilac flower. The compound is 2 - (1'-hydroxylmethyl -ethyl) -5- methyl-5-vinyl-tetrahydrofuran having the following formula:

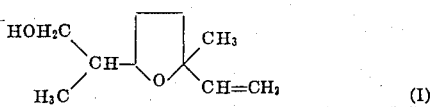

Accordingly, an object of the present invention is to provide a new compound useful as a perfume ingredient.

The new compound, 2-(1'-hydroxymethyl-ethyl) -5-methyl -5-vinyl-tetrahydrofuran, having the above formula, has four stereoisomers. It is very difficult to separate these isomers, since they extremely close to each other, therefore, the perfume value of each individual isomer has not been confirmed as yet. However, a mixture of the four isomers has value as a perfume.

Therefore the compound, 2-(1'-hydroxymethyl-ethyl)-5-methyl-5-vinyl- tetrahydrofuran of the present invention is a mixture of the four isomers.

Since the above compound has been discovered in the essential oil of a lilac flower, the compound has been named "lilac alcohol" which name will be used hereinafter.

When the lilac alcohol is used as an ingredient for various floral perfumes, it gives a very good fragrance. In other words, this lilac alcohol harmonizes well with other odoriferous compounds; thus being useful in the preparation of a great variety of perfume compositions.

In addition, because of the strong fixative property of the lilac alcohol, a perfume composition containing this lilac alcohol retains advantageously harmonized floral odors for a considerably long period of time.

Accordingly, this lilac alcohol may be advantageously used to prepare various perfume compositions, and the amount may be varied within a wide range, preferably 10 to 15 percent by weight.

The lilac alcohol of the present invention can be produced by selectively reducing the formyl radical of 2-(1'-formyl-ethyl)-5-methyl-5-vinyl-tetrahydrofuran having the following formula:

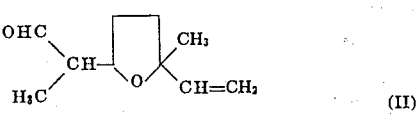

The compound having the above formula is known to the art and a process for its production is disclosed in P. Naegel and G. Weber, Tetrahedron Letters, No. 12, pages 959 to 962 (1970).

Reducing agents, suitable for selectively reducing the formyl radical of the compound shown in the above formula, include sodium borohydride, lithium aluminum hydride, and lithium borohydride. The Meermein-Ponndorf reduction process which employs aluminum alcoholate as the reducing agent may also be used.

The gas chromatographic analysis of the lilac alcohol obtained by the above-described processes proves that the lilac alcohol so produced consists of a mixture of four isomers, the same as those found in the essential oil of the natural lilac flower.

The following examples are given to illustrate the process for synthetically producing the lilac alcohol and for formulating perfume compositions containing the lilac alcohol.

EXAMPLE 1

6.7 grams (0.04 mols) of 2-(1'- formyl -ethyl)-5-methyl -5-vinyl -tetrahydrofuran was dissolved in 10 ml of methanol. Then, the solution thus prepared was added dropwise to 40 ml of a methanol solution containing 1.5 grams of sodium barohydride while agitating. The reaction was carried out at a temperature of below 35°C for two hours. The remaining sodium borohydride was decomposed with acetone and the reaction mixture was then added to ice water. The oil components were then extracted with ether which was then distilled off to give a reaction product of 7.1 grams. This product was fractionated, yielding 5.9 grams of lilac alcohol. The product was found to possess the following properties:

Boiling point : 113°–115°C/12 mmHg, $d_{20}^{20}=0.9778$, $n_D^{20}=1.4551$, Spectrum absorption at IR=$\nu_{max}$ 3520 cm$^{-1}$, 3,080, 1,640, 990, 920 cm$^{-1}$, 1,110, 1,040 cm$^{-1}$.

The above properties indicate that this product includes alcohol and vinyl radicals and ether linkage.

Analysis for $C_{10}H_{18}O_2$

Calculated values (percent) : C=70.59, H=10.59
Found values (percent) : C=70.30, H=10.72

EXAMPLE 2

6.7 gram (0.04 mols) of 2-(1'- formyl - ethyl) -5-methyl-5- vinyl- tetrahydrofuran was dissolved in 50 ml of anhydrous isopropyl alcohol. The solution thus prepared was added to 20 ml of an anhydrous isopropyl alcohol solution of aluminum isopropoxide (3 grams). This mixture was boiled in an oil bath and the acetone formed during the reaction was distilled off. The reaction was continued for 2 hours. Upon completion of the reaction, 500 ml of water was added dropwise therein so as to decompose the excess aluminum isopropoxide. 20 ml of 5 percent sulfuric acid was then added to dissolve the aluminum hydroxide and the reaction product was extracted with ether. After the ether was distilled off, the resulting extract was fractionally distilled at 113°–115°C/12 mmHg to obtain 6 grams of the desired fraction. The product thus obtained was found to be lilac alcohol having same properties as that obtained in Example 1.

Perfume compositions including the lilac alcohol obtained in Examples 1 and 2 as a ingredient are shown below. (The perfume compositions of Examples 3–6 were prepared by blending the ingredients using a conventional blending process.)

EXAMPLE 3

| Ingredients : | Parts by Weight |
|---|---|
| Lilac type perfume composition : | |
| Lilac alcohol | 15 |
| Phenylethyl alcohol | 25 |
| Benzylacetate | 10 |
| Aubepine | 6 |
| Cinnamic alcohol | 10 |
| Corollal | 30 |
| Iso-eugenol | 1 |
| Amylcinnamic aldehyde | 3 |
| Total | 100 |

EXAMPLE 4

A chypre perfume composition:

| | |
|---|---|
| Lilac alcohol | 200 |
| Bergamot Oil | 200 |
| Benzylacetate | 70 |
| Linalool | 30 |
| Dihydrojasmone, 10% in benzyl alcohol | 20 |
| Phenylethyl alcohol | 20 |
| Gamma-methyl ionone | 50 |
| Iso-eugenol | 30 |
| Santalex T | 60 |
| Oakmoss absolute | 60 |
| Vetiverol | 60 |
| Heliotropine | 40 |
| Coumarine | 90 |
| Musk ketone | 30 |
| Musk ambrette | 20 |
| Vanillin | 20 |
| Total | 1000 |

EXAMPLE 5

Lilac type perfume composition:

| | |
|---|---|
| Lilac alcohol | 40 |
| Phenylethyl alcohol | 10 |
| Benzyl acetate | 8 |
| Aubepine | 5 |
| Cinnamic alcohol | 7 |
| Cyclamene aldehyde | 3 |
| Corollal | 5 |
| Linalool | 3 |
| Laurinal | 5 |
| Heliotropine | 3 |
| Iso-eugenol | 2 |
| Terpineol | 7 |
| Courmarine | 2 |
| Total | 100 |

EXAMPLE 6

Fourgere perfume composition:

| | |
|---|---|
| Lilac alcohol | 350 |
| Lavender oil | 150 |
| Linalyl acetate | 100 |
| Methyl ionone | 10 |
| Patchouli oil | 10 |
| Oakmoss absolute | 10 |
| Bergamot oil | 150 |
| Geraniol | 20 |
| Dihydrojasmone, 1% in benzyl alcohol | 20 |
| Vetiverol | 20 |
| Phenylethyl alcohol | 15 |
| Musk ketone | 50 |
| Coumarine | 80 |
| Vanillin | 15 |
| Total | 1000 |

The perfume composition of Examples 3–6 were found to have a better balanced fragrance and a more natural and more pleasant floral note than a composition containing no lilac alcohol. The fragrance was retained longer than compositions containing no lilac alcohol.

What is claimed is:

1. A perfume composition comprising a fragrance imparting amount of 2-(1'hydroxymethyl-ethyl)-5-methyl-5-vinyl-tetrahydrofuran and at least one other odorferous compound.

2. The perfume composition of claim 1 wherein the amount of said 2-(1'hydroxymethyl-ethyl)-5-methyl-5-vinyl-tetrahydrofuran present is within the range of from 10 percent to 40 percent by weight of said composition.

3. The perfume composition of claim 1 wherein the amount of said 2-(1'hydroxymethyl-ethyl)-5-methyl-5-vinyl-tetrahydrofuran present is within the range of from 10 percent to 15 percent by weight of said composition.

* * * * *